United States Patent [19]

Ito et al.

[11] Patent Number: 5,051,900
[45] Date of Patent: Sep. 24, 1991

[54] AUTOMATIC BILL COLLECTING METHOD IN AUTOMATIC TELLER MACHINE

[75] Inventors: Michiro Ito, Seto; Naoki Kimizu, Owariasahi, both of Japan

[73] Assignees: Hitachi, Ltd., Tokyo; Chuba Hitachi Electric Co., Ltd., Aich, both of Japan

[21] Appl. No.: 408,257

[22] Filed: Sep. 18, 1989

[30] Foreign Application Priority Data

Sep. 19, 1988 [JP] Japan .................. 63-234442

[51] Int. Cl.⁵ .................. G06F 15/30
[52] U.S. Cl. .................. 364/408; 235/379; 902/12
[58] Field of Search .............. 364/401, 408; 235/375, 235/379, 385; 902/8, 12

[56] References Cited

U.S. PATENT DOCUMENTS

| | | | |
|---|---|---|---|
| 4,365,700 | 12/1982 | Arimoto et al. | 235/379 X |
| 4,524,268 | 6/1985 | Fukatsu | 235/379 |
| 4,558,211 | 12/1985 | Berstein | 235/380 |
| 4,621,326 | 11/1986 | Rawlins | 364/408 |
| 4,795,889 | 1/1989 | Matuura et al. | 235/379 |
| 4,816,652 | 3/1989 | Wildgoose et al. | 235/379 |
| 4,851,994 | 7/1989 | Toda et al. | 364/200 |

FOREIGN PATENT DOCUMENTS 0177680 10/1984 Japan .................. 364/401

OTHER PUBLICATIONS

Imamichi et al., *Patent Abstracts of Japan*, Group No. P232, vol. 7, No. 241, Abstract No. 58-127268.

*Primary Examiner*—Jerry Smith
*Assistant Examiner*—David Huntley
*Attorney, Agent, or Firm*—Fay, Sharpe, Beall, Fagan, Minnich & McKee

[57] ABSTRACT

An automatic bill collecting method in an automatic teller machine comprising first bill boxes for respective bill denominations, a detecting device for detecting if each of the first bill boxes is full of a predetermined number of bills, a second bill box for storing bills to be collected, and a memory for storing the number of bills to be collected from the first bill box into the second bill box, comprises the steps of storing in the memory a value equivalent to the number of bills set in a central processor, detecting from the detecting device that the first bill box is full of the predetermined number of bills, and transferring the stored number of bills from the first bill box detected to be full of bills to the second bill box.

10 Claims, 7 Drawing Sheets

FIG. 3A

| DAY OF THE WEEK | THE NUMBER OF BILL TO BE COLLECTED |
|---|---|
| MONDAY | A |
| TUESDAY | B |
| WEDNESDAY | C |
| THURSDAY | D |
| FRIDAY | E |
| SATURDAY | F |

FIG. 3B

| DATE | THE NUMBER OF BILL TO BE COLLECTED |
|---|---|
| 1ST~5ST | A |
| 6ST~24ST | B |
| 25ST~30ST | C |

FIG. 3C

| PLACE | THE NUMBER OF BILL TO BE COLLECTED |
|---|---|
| BRANCH A | A |
| BRANCH B | B |
| STATION | C |
| ENTERPRISE | D |
| DEPARTMENT STORE | E |
| HOSPITAL | F |

AUTOMATIC BILL COLLECTING METHOD IN AUTOMATIC TELLER MACHINE

BACKGROUND OF THE INVENTION

The present invention relates to an automatic teller machine and more particularly to an automatic bill collecting method having the steps of detecting when the bill boxes for respective bill denominations installed in the machine are full, and automatically storing the bills contained in a full bill box into another bill box for collecting.

Automatic teller machines in use are designed to collect bills received into bill boxes, according to their respective bill denominations, after identifying their denominations and to draw the bills out of these bill boxes for payment.

When a bill box for a particular bill denomination becomes full, however, no more bills can be received. As a result, it is necessary for a predetermined number of collected bills to be transferred from the bill box into another one so as to provide room for the reception of new bills.

This process of collecting bills is accomplished by providing each bill box with a sensor for detecting its full condition. When a bill box is detected as being completely full, a predetermined number of bills are drawn out of this bill box and transferred into another one.

The aforementioned conventional bill collecting method presets the number of bills to be collected, so that the preset number of bills is automatically collected when the full condition of a bill box is detected.

The disadvantage of this method is that the operating efficiency may decrease, depending on the day-to-day operation of transactions, because the number of bills collected is fixed.

When the incoming amount is greater than the outgoing amount, for instance, the number of bill collecting times tends to increase if the number of collecting bills is preset rather small. Thus, performance of transactions is restricted to that extent.

When the outgoing amount is greater than the incoming amount, on the other hand, the residual amount of bills contained in the bill box, for a particular bill denomination, tends to quickly diminish if the number of collecting bills is preset rather large, thus resulting in the necessity of filling up the bill box for a bill denomination again. The performance of transactions is also restricted by the replenishing operation.

SUMMARY OF THE INVENTION

An object of the present invention is to provide an automatic bill collecting method in an automatic teller machine that affects customer transactions to the smallest possible degree, while preventing a decrease in operating efficiency.

The foregoing object is accomplished varying the setting of the number of collected bills transferred or collected according to instructions from a central processor in conformity with the daily operation of transactions.

When the incoming amount is greater than the outgoing amount, for instance, the number of collected bills is set rather large.

When the outgoing amount is greater than the incoming amount, moreover, the number of collected bills is set rather small.

The number of collected bills is automatically variably set according to instructions from the central processor.

BRIEF DESCRIPTION OF THE DRAWINGS

FIG. 3A is a diagram of a table showing the number of bills to be collected on a daily basis.

FIG. 3B is a diagram showing the contents of a table showing the number of bills to be collected on a date basis.

FIG. 3C is a diagram of a table showing the number of bills to be collected on a location-of-automatic-teller-machine basis.

DETAILED DESCRIPTION OF THE PREFERRED EMBODIMENT

Figure 1:
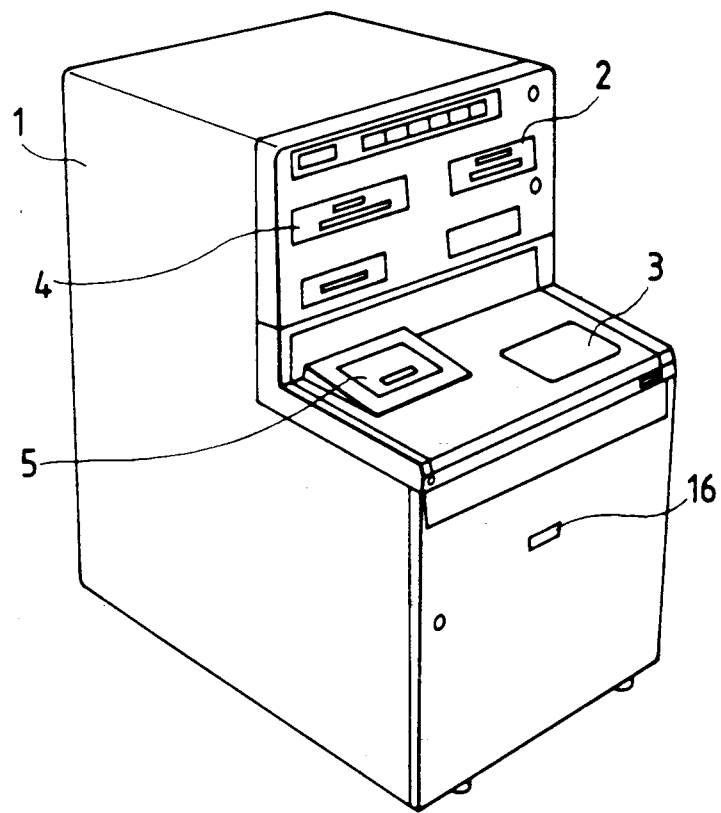
FIG. 1 is a drawing of an automatic teller machine.

FIG. 1 is a drawing of an automatic teller machine showing an automatic teller machine body 1, a magnetic card slot, which is also used as a detailed account slip discharge slot 2, a customer touch panel input which is also used as a guidance display panel 3, a bankbook slot 4, a bill recycle port 5, and a human body sensor 16.

Figure 2:
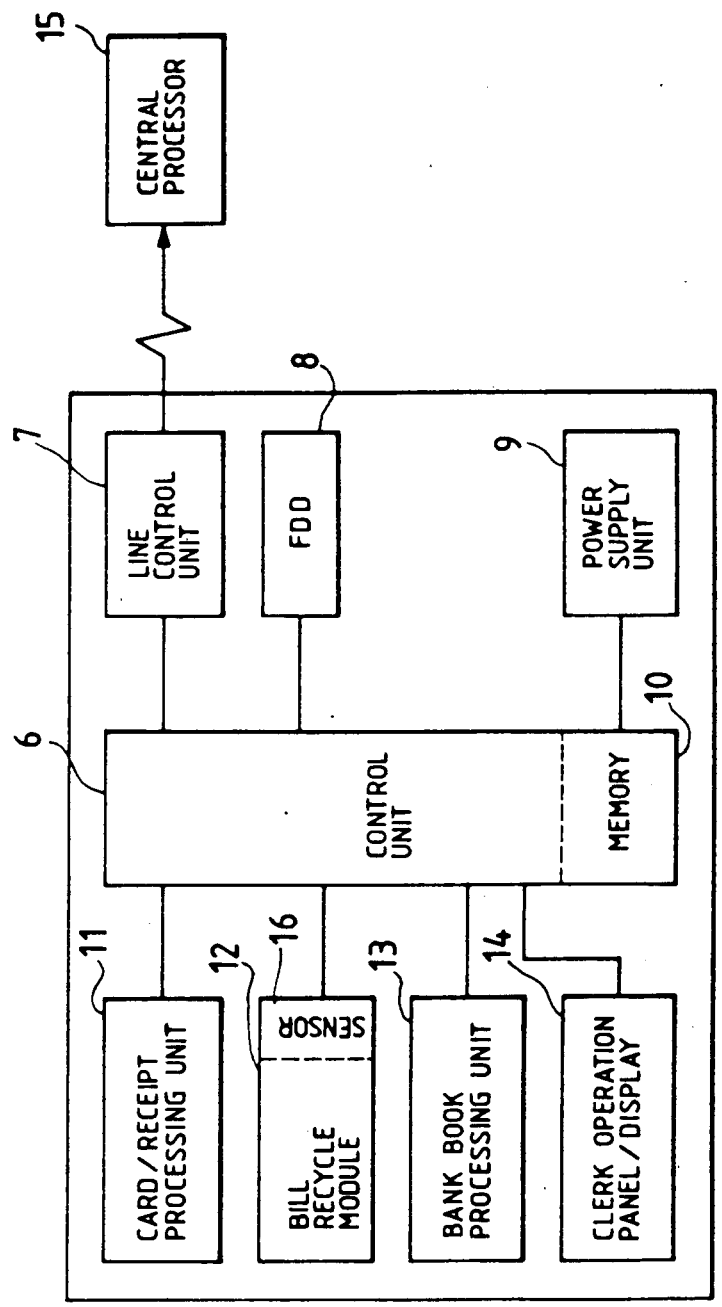
FIG. 2 is a block diagram illustrating a system configuration of the automatic teller machine.

FIG. 2 is a block diagram illustrating a system configuration of the automatic teller machine. The system includes a control unit 6 which incorporates a memory 10 for storing command information concerning the number of bills to be collected from a central processor 15 and is used for controlling the machine unit as a whole, a line control 7 for controlling a communication line connected to the central processor 15, a flexible disk drive (FDD) 8, a power supply unit 9 for supplying power to the machine as a whole, a card/receipt processing unit 11 for reading and writing data from and to a magnetic card and issuing slips, a bill recycle module 12 for recycling bills received as those for payment and having built-in sensors for detecting the full conditions of bill boxes for storing bills received, a bankbook printer 13, and a guidance display customer operation panel 14.

The central processor 15 is equipped with an accumulation counter (not shown) for computing the classified total of the number of bills received and paid, and capable of controlling the difference between the number of bills received and the number of bills paid.

The automatic teller machine adds the number of bills received and bills paid to a message addressed to the central processor 15 when it transmits and receives messages to and from the central processor 15 each time a transaction with a user takes place. The automatic teller machine also updates the counter for computing the classified total of the number of bills received and paid whenever the central processor 15 permits it to receive and pay bills. Based on the accumulated number of bills received and paid, which has been computed by the counter, the central processor 15 operates to set or change the number of bills collected. First, the ratio of increase in the number of bills is computed from the difference between the bills received and paid per unit time in accordance with the transactions performed. Then, the previously set number of collecting bills is changed to an adequate one while feeding back fluctuations of the ratio of increase. This process of changing the set number of collecting bills will subsequently be described by way of example.

As set forth above, the number of bills received or paid is successively transmitted to the central processor 15 as transaction data each time a bill is received or paid by the automatic teller machine. The central processor 15 keeps computing the number of bills received and paid.

Assuming the number of bills under the control of the central processor 15 is 100 at 9 a.m. and that the number of bills received and the number of bills paid come up to 500 and 300 at 10 a.m. respectively as a result of transactions, the balance therebetween amounts to an increase of 200 bills for storage per hour. While the balance increases at a rate of 200 bills per hour, the number of collecting bills is accordingly preset at 100. If the balance between the number of bills received and that of bills paid increases to 300 bills at 11 a.m., the preset number of collecting bills is changed to 200 and this data is transmitted from the central processor 15 to the automatic teller machine.

If the balance therebetween increases to 500 bills per hour at noon, the number of collecting bills is changed and reset to 300. If the balance therebetween decreases to 200 bills per hour at 1 p.m., the number of collecting bills is corrected to 100.

In this way, the number of collecting bills is dynamically corrected by the central processor 15 in conformity with an increase or decrease in the number of bills stored in the automatic teller machine.

As another example of changing the setting of the number of collecting bills, a feasible arrangement is to make the central processor 15 change the preset number of collecting bills on a weekday basis by providing a table as shown in FIG. 3A, beforehand. Since the number of bills paid normally increases on Friday, for instance, the number of collecting bills is preset smaller than on any other weekday.

Also, a possible arrangement is to make the central processor 15 change the preset number of collecting bills on a date basis by providing a table as shown in FIG. 3B. Since the number of bills paid on and after the 25th day of a month increases, for instance, the number of collecting bills is preset smaller than on other dates.

Figure 4:
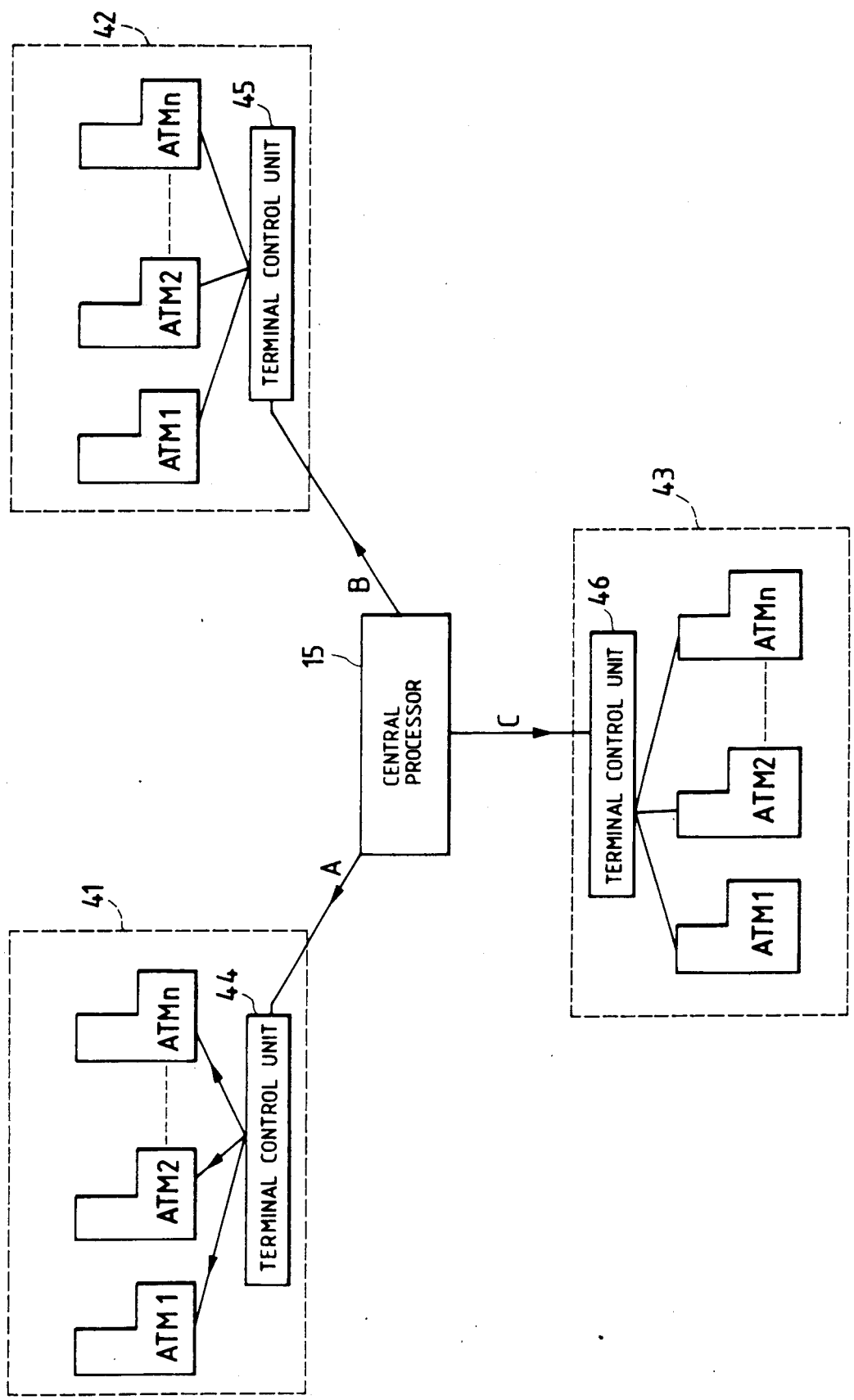
FIG. 4 is an overall system chart illustrating the relation between a central processor and automatic teller machines connected thereto.

Furthermore, an applicable arrangement is to make the central processor 15 preset the number of collecting bills on a location-of-automatic-teller-machine basis by providing a table as shown in FIG. 3C. As shown in FIG. 4, there are branches 41, 42 and a station 43. Branch A has N sets of automatic teller machines (ATM1-ATMn) installed therein. The automatic teller machines are connected via respective terminal control units 44, 45, 46 to the central processor 15. Branch B and the station are connected to the central processor 15 in likewise fashion.

According to FIG. 3C, central processor 15 sets the number of collecting bills at A for branch 41, B for branch 42 and C for station 43.

Upon receipt of data on the number of collecting bills from the central processor 15, branch 41 gives each automatic teller machine this data via the terminal control unit 44. Similarly, the branch 42 and the station 43 also receive the preset number of collecting bills from the central processor 15.

Figure 5:
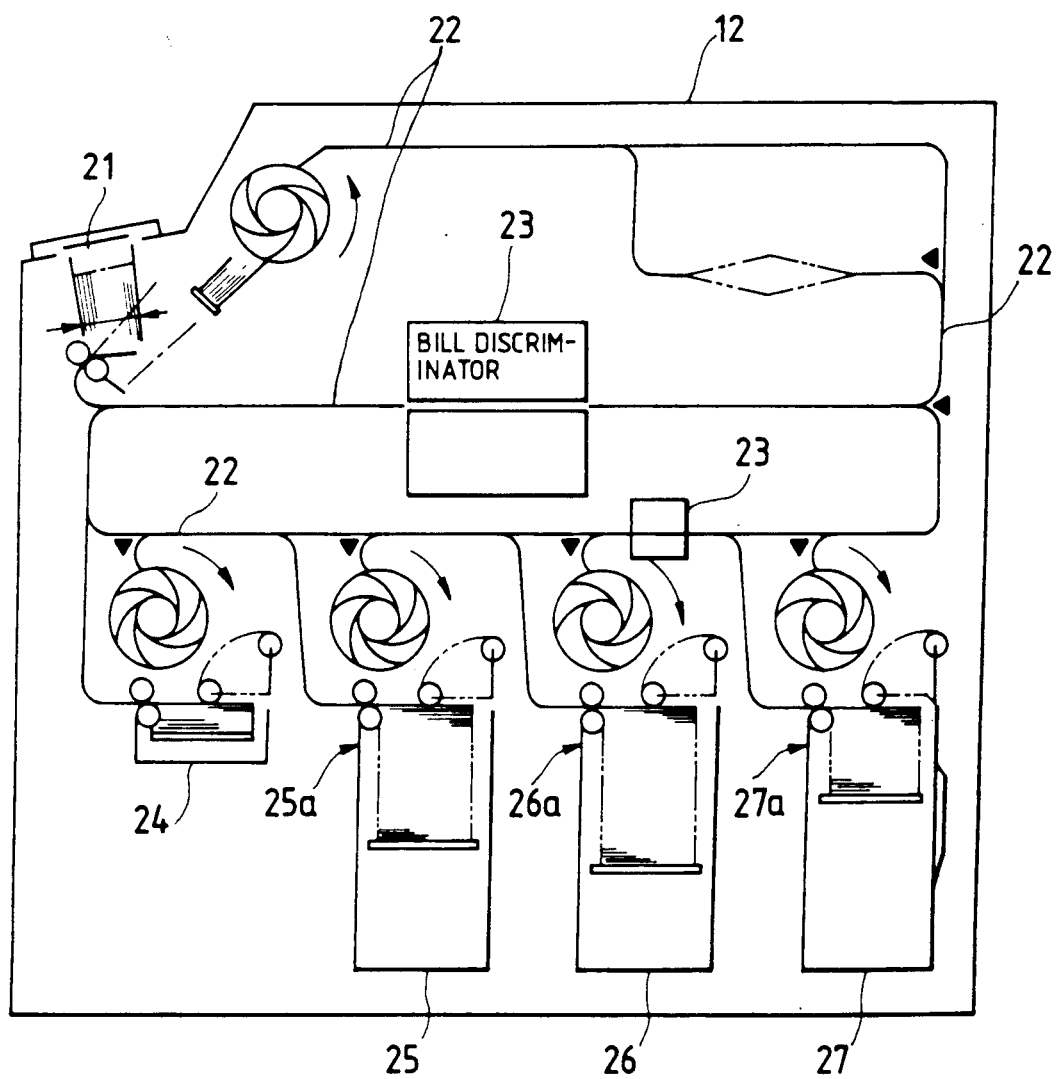
FIG. 5 is a diagram illustrating the bill recycle module 12 of FIG. 2 in detail.

FIG. 5 is a diagram illustrating the bill recycle module 12 in detail. As shown in FIG. 5, the bill recycle module 12 has a bill recycle port 21, a conveyer 22 including rollers and belts, a discriminator 23 for examining the genuineness of bills and identifying bill denominations, a container 24 for temporarily storing the bills judged genuine by the discriminator 23, bill boxes 25 and 26 for storing, via conveyer 22, denominations A, B of the bills judged by the discriminator 23 to be recycled ones, and a bill box 27 for receiving collecting bills.

The aforementioned bill boxes, 25 and 26 are fitted with full-condition sensors 25a, 26a, respectively. The bill box 27 is also provided with a full-condition sensor 27a.

The reception of bills is described by way of example. When a bill is inserted by a customer through the bill recycle port, the bill is carried by the conveyer up to the discriminator 23, which examines the bill to determine whether it is genuine and identifies its denomination. If the bill is judged to be counterfeit, it is returned to the bill recycle port 21. If the bill is deemed genuine, it is temporarily stored in container 24.

When the customer touches a confirmation key (not shown) displayed on the guidance panel 3, the bill stored in the container 24 is drawn out and put in bill box 25 when it is judged by the discriminator to be bill denomination A and in bill box 26 when judged to be bill denomination B.

If the customer touches a cancellation key (not shown) displayed on the guidance panel 3, the bill stored in container 24 is returned to bill recycle port 21.

When the reception of the bill causes the sensor 25a to detect the full condition of the bill box 25 for the bill denomination A, the number of collecting bills designated by the central processor and stored in the memory 10 is drawn out of the bill box 25 and transferred via the discriminator to bill box 27.

Figure 6:
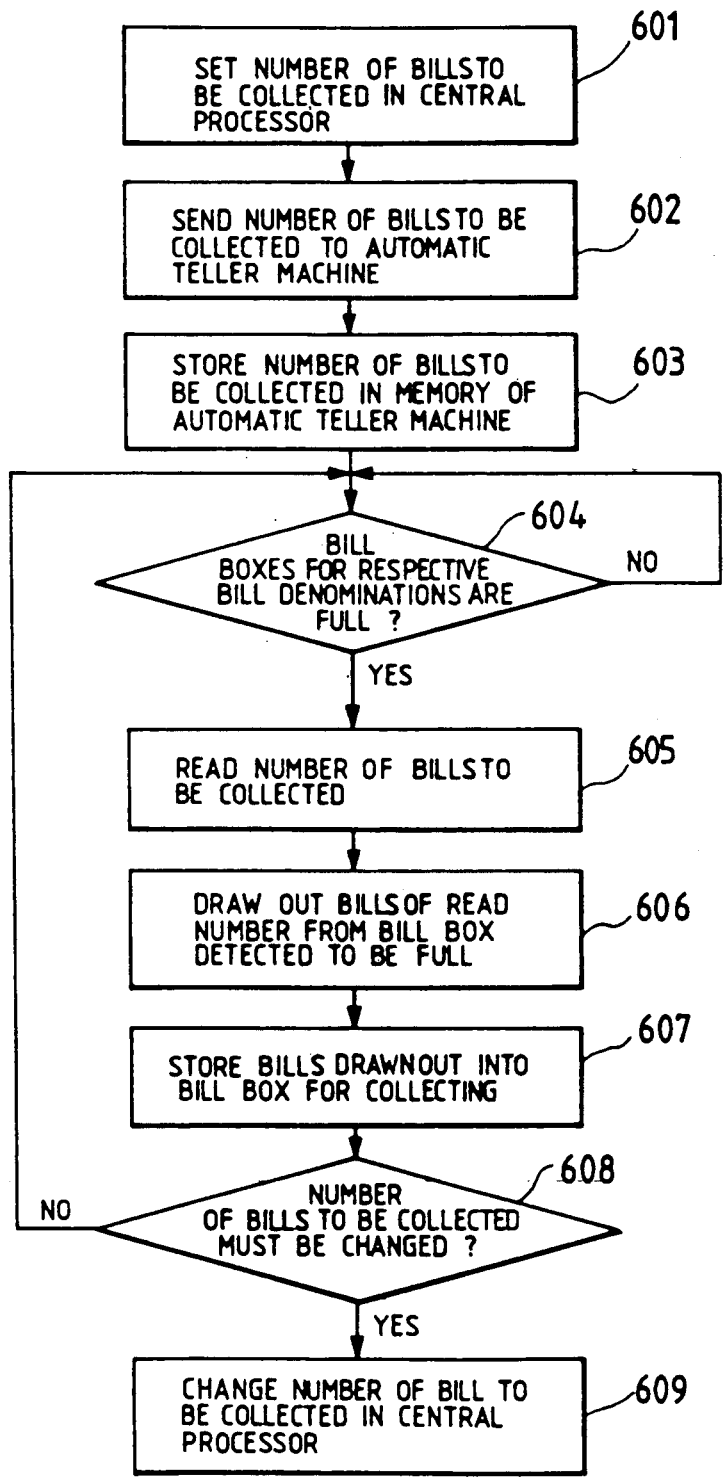
FIG. 6 is a flowchart showing an automatic bill collecting operation.

With reference to the flowchart of FIG. 6, the automatic collecting operation will be described.

The central processor 15 sets a value equivalent to the number of bills to be automatically collected (Step 601).

The set number of bills to be automatically collected is transmitted to the automatic teller machine (Step 602).

The set number of bills to be automatically collected is stored in the memory 10 (Step 603).

A decision is subsequently made on whether the bill boxes 25, 26 for respective bill denominations are full (Step 604).

If YES in Step 604, the number of bills to be automatically collected as stored in the memory 10, is read (Step 605).

The number of bills, read from memory 10, is subsequently drawn out of the bill box thus detected to be full (Step 606).

The bills, thus drawn out, are stored into the bill box 27 (Step 607).

When the number of bills to be automatically collected is altered, what had been set in the central processor is changed (Steps 608, 609).

Figure 7:
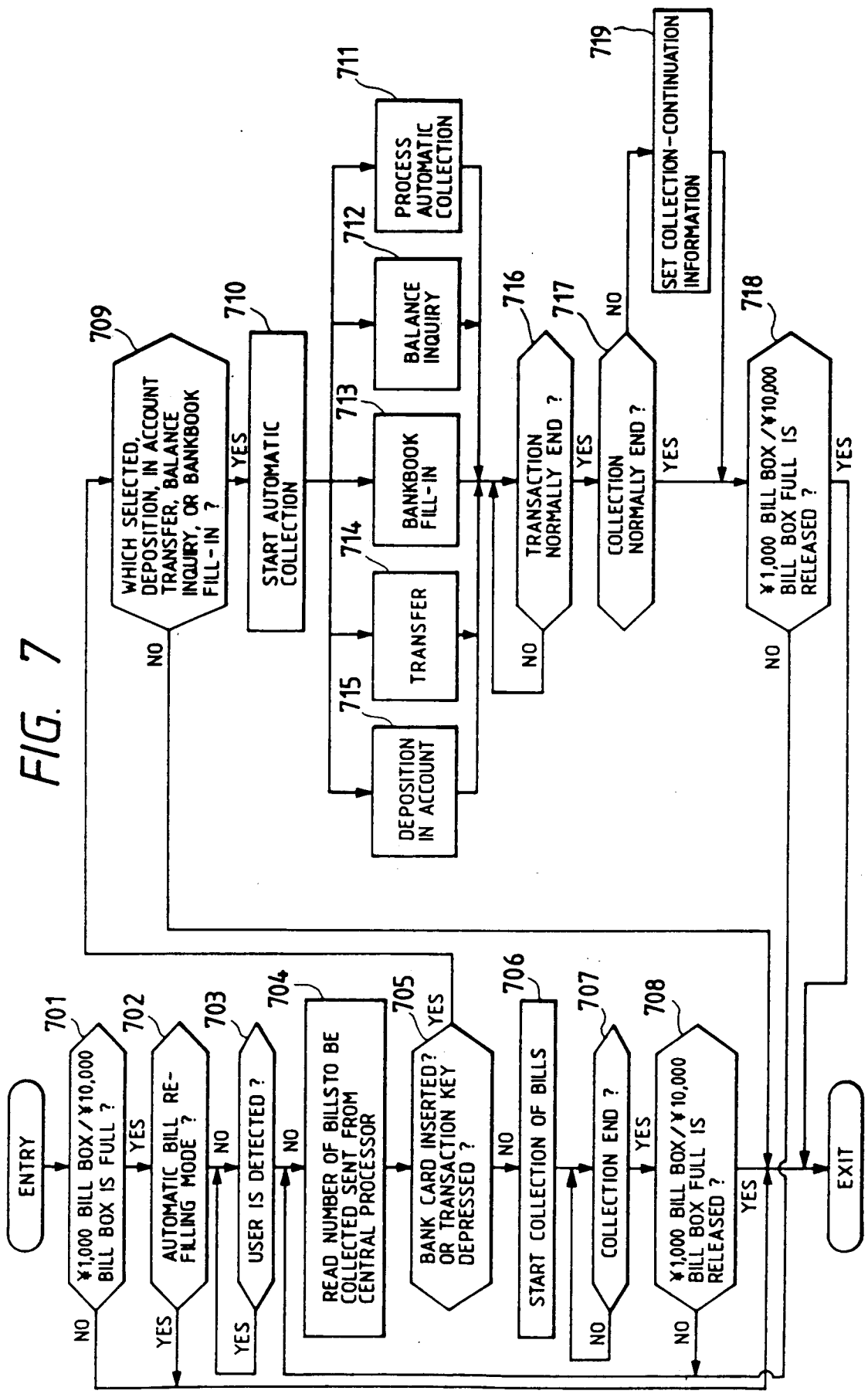
FIG. 7 is a flowchart showing the whole process conducted in the automatic teller machine.

An example of the overall process, including the automatic collecting operation in an automatic teller machine is shown FIG. 7.

The set number of bills to be automatically collected which has been received as initial data at the time the automatic teller machine 1 starts to operate, is prestored in the memory 10. Moreover, the automatic teller machine 1, after it has started to operate, exchanges transaction messages with the central processor 15 each time a transaction is performed and adds the number of bills received and that of bills paid to a message addressed to the central processor 15. The automatic teller machine 1 also updates the counter (not shown) for computing the classified total of the number of bills received and paid whenever the central processor 15 permits it to receive and pay bills, so that it can control the difference between the number of bills received and that of bills paid at all times.

On a normal operating day, the initially set number of bills as a unit is collected from one of the bill boxes 25 and 26 when one is detected to be completely full of the bill denomination involved when the bill recycle module 12 is detected to be full (Step 701). Next, Steps 702–705 are followed; i.e. decisions are made on whether an automatic bill refilling mode is established (Step 702), whether a user is detected (Step 703), and whether the transaction key is depressed (Step 705). Then the number of bills to be automatically collected which has been stored in the memory 10 is read (Step 704) and the collection of bills for the bill denomination involved is started in conformity with the set value (Step 706). When the ¥ 10,000 bill box 25 is full, for instance, 200 bills stored in the central processor 15 are collected from the ¥ 10,000 bill box 25 into the safe 27.

While the automatic teller machine is waiting for a customer, the collecting operation is then started immediately after the detection of the full condition. While a customer is performing transactions with the machine, the human body sensor 16 is used to detect the presence or absence of a next customer at the timing of change of customers upon the termination of the preceding transaction. The collecting operation is started when the absence of the next customer is found.

When the collecting operation is completed, the full-condition sensor 25a or 26a is employed to check if the full condition is released (Steps 707, 708). If the full condition still remains, Steps 704–707 are repeated.

The processing is terminated if the full-condition has been released. The "detection of full condition" may refer to not only an actual full value, the instant a full condition is reached, but also allows for some room (i.e. the operation is possible even after the detection of full condition).

In Step 704, the number of collecting bills received from the central processor 15 is read. As set forth above, the automatic teller machine 1, after it has started to operate, adds the number of bills received and that of bills paid to the message addressed to the central processor 15 when it exchanges transaction messages with the central processor 15 each time a transaction is performed. The automatic teller machine 1 also updates the counter (not shown) for computing the classified total of the number of bills received and paid whenever the central processor 15 permits it to receive and pay bills, so that it can control the difference between the number of bills received and that of bills paid at all times. This means the automatic teller machine 1 reads the results received as to the revised number of collecting bills. When the number of bills received is relatively greater than that of bills paid, for instance, the aforementioned initial set value of 200 bills is changed to 500 bills.

Assuming 1,000 bills in total are collected on the day when the number of collecting bills at one time is fixed at 200 in the embodiment above, for instance, the automatic collecting process is to be performed five times, i.e.

$$1,000 \div 200 = 5.$$

If the central processor sets the number of collecting bills each time at 500 it becomes only necessary to carry out the automatic collecting process twice, i.e.

$$1,000 \div 500 = 2.$$

Provided the operating time required for the curtailed three collecting operations amounts to 2 min × 3 = 6 min in total, the restricted transaction time decreases by 6 minutes and approximately 12 additional transactions are performed during that time.

In Step 709, a decision is made on whether the transaction requires use of the bill recycle module 12 when the next customer presses the transaction-selection key. The automatic collecting operation is started (Step 710) if the transaction involves deposit to an account, balance inquiry, bankbook fill-in or transfer which does not necessitate the use of the bill recycle module 12. While the command is awaited, the operation is conducted in parallel to a transaction, other than a cash transaction, with the customer in Steps 711–715 and the collection end command is detected in Step 717 upon the termination of the transaction with the customer (Step 716). If the transaction is terminated at this time, one collection unit is assumed terminated. Otherwise, the detection of the similar end command is repeated upon termination of the transaction with the following customer.

With this arrangement, any cashless transactions and bill collecting operations are conducted in parallel, whereby services can be rendered to customers seeking transactions including deposit to account, balance inquiry, bankbook fill-in or transfer. In the case of the aforementioned specific example, the operating time for collecting that is equivalent to 2 min × 5 = 10 min becomes utilizable.

As set forth above, the number of bills to be collected from the bill boxes can be optimized according to the present invention, so that an automatic teller machine fit for unattended operation can be materialized.

What is claimed is:

1. An automatic bill collecting method in an automatic teller machine comprising first bill boxes for respective bill denominations, detecting means for detecting whether each of said first bill boxes is full of a predetermined number of bills, a second bill box for storing bills to be collected from said first bill boxes into said second bill box, and a memory means for storing the number of bills to be collected from said first bill boxes into said second bill box, said method comprising the steps of storing in said memory means a value equivalent to said number of bills to be collected set in a central processor, changing the number of bills to be collected in the central processor based upon information relating to bills received and paid in said automatic teller machine, communicating a new number equivalent to said changed number of bills to be collected from the central processor to the automatic teller machine, storing the new number in said memory means, detecting that one of said first bill boxes is full of the predetermined number of bills, and transferring the stored number of bills to be collected from the one of said first bill boxes detected to be full of bills to said second bill box.

2. An automatic bill collecting method as claimed in claim 1, further comprising the steps of adding a number of bills received and a number of bills paid to messages addressed to said central processor when said automatic teller machine exchanges transaction messages with said central processor, accumulating the numbers in said central processor, updating the accumulated numbers each time said central processor receives the messages from said automatic teller machine, and performing said step of changing based upon the updated numbers.

3. An automatic bill collecting method as claimed in claim 1, further comprising the step of identifying bill denominations when bills are collected from said first bill boxes into said second bill box.

4. An automatic bill collecting method as claimed in claim 1, wherein the operation of collecting bills from said first bill boxes into said second bill box is conducted when the absence of a customer is detected by a human body sensor installed on a front panel of said automatic teller machine.

5. An automatic bill collecting method as claimed in claim 1, further comprising the steps of detecting whether a transaction involves the handling of bills or not in said automatic teller machine, conducting the operation of collecting bills from said first bill boxes into said second bill box in parallel to the transaction when the transaction does not involve the handling of bills.

6. An automatic bill collecting method in an automatic teller machine comprising first bill boxes for respective bill denominations, detecting means for detecting whether one of said first bill boxes is full of a predetermined number of bills, a second bill box for storing bills to be collected from said first bill boxes into said second bill box, and a memory means for storing the number of bills to be collected from said first bill boxes into said second bill box, said method comprising the steps of storing a predetermined table for determining the number of bills to be collected as a function of at least one parameter in a central processor, determining the number of bills to be collected based upon said table, communicating from said central processor to the automatic teller machine a value equivalent to the determined number, storing in said memory means the value equivalent to the determined number, detecting when said one of said first bill boxes is full of the predetermined number of bills, and transferring the stored number of bills to be collected from the one of said first bill boxes, detected to be full of bills, into said second bill box.

7. An automatic bill collecting method as claimed in claim 6, wherein said table stores the number of bills to be collected as a function of day of the week.

8. An automatic bill collecting method as claimed in claim 6, wherein said table stores the number of bills to be collectd as a function date.

9. An automatic bill collecting method as claimed in claim 6, wherein said table stores the number of bills to be collected as a function of.

10. An automatic bill collecting system comprising an automatic teller machine for performing banking transactions and a central processor connected to said automatic teller machine, wherein said automatic teller machine comprises:

first bill boxes for respective bill denominations, detecting means for detecting whether one of said first bill boxes is full of a predetermined number of bills, a second bill box for storing bills to be collected from said first bill boxes into said second bill box, a memory means for storing the number of bills to be collected, wherein the number is a value equivalent to a number of bills set in and communicated from said central processor, and means for transferring the stored number of bills to be collected from said one of said first bill boxes detected to be full of bills into said second bill box; and wherein said central processor comprises means for setting the number of bills to be collected, means for computing the respective totals of numbers of received bills and numbers of said bills in said automatic teller machine paid out from said automatic teller machine, means for accumulating the computed respective totals, means for updating the accumulated totals based upon numbers of received bills and numbers of bills paid out from said automatic teller machine each time a transaction takes place in said automatic teller machine and means for changing the set number of bills to be collected based upon the updated totals.

* * * * *